(Model.)
W. KIRKPATRICK.
EGG TESTER.
No. 259,171. Patented June 6, 1882.
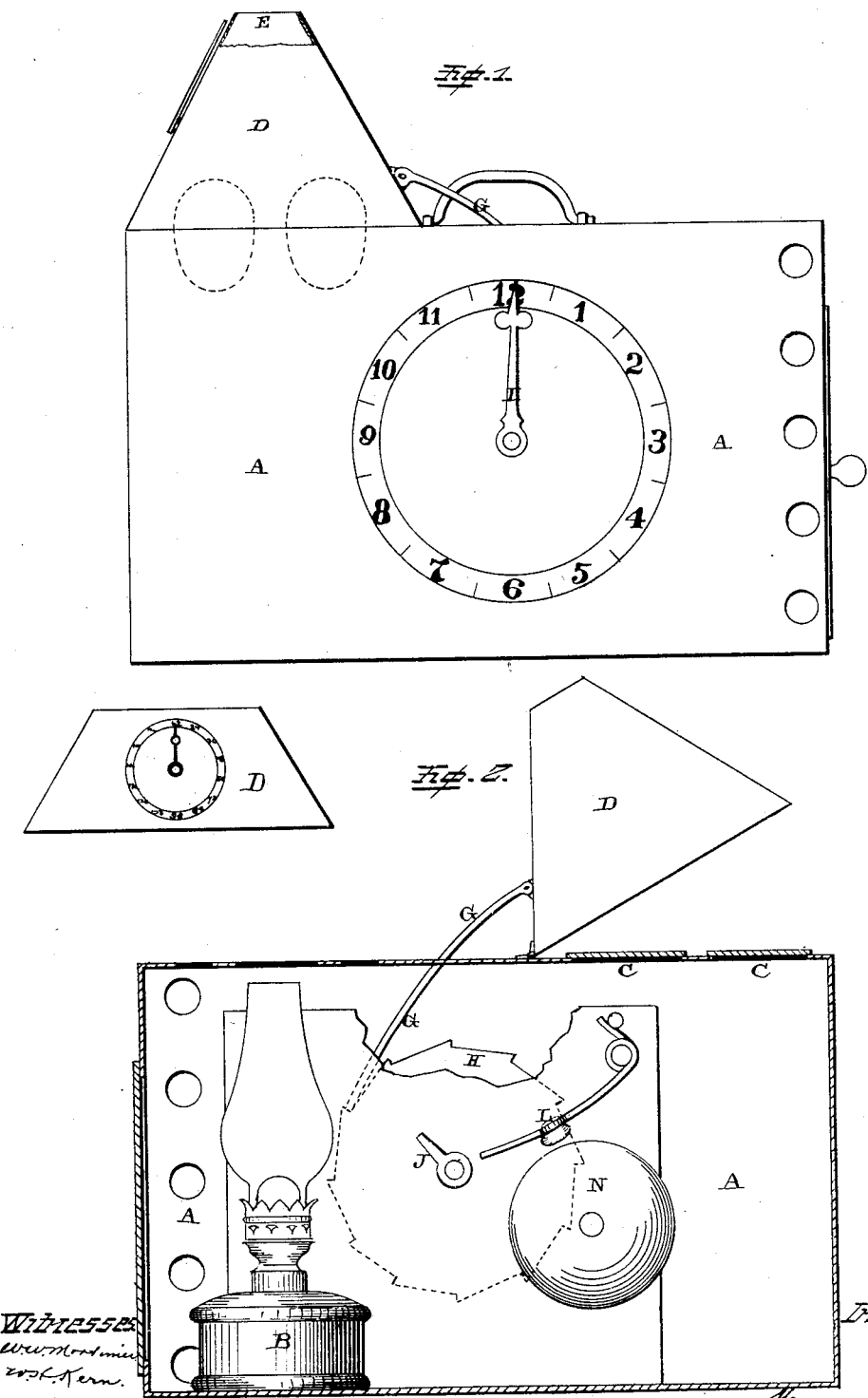

UNITED STATES PATENT OFFICE.

WALLACE KIRKPATRICK, OF ANNA, ILLINOIS.

EGG-TESTER.

SPECIFICATION forming part of Letters Patent No. 259,171, dated June 6, 1882.

Application filed March 16, 1882. (Model.)

*To all whom it may concern:*

Be it known that I, W. KIRKPATRICK, of Anna, in the county of Union and State of Illinois, have invented certain new and useful Improvements in Egg-Testers; and I do hereby declare the following to be a full, clear, and exact description of the invention, such as will enable others skilled in the art to which it pertains to make and use it, reference being had to the accompanying drawings, which form part of this specification.

My invention relates to an improvement in egg-testers; and it consists in the combination of a frame or box in which a lamp or any light is placed, and having a series of openings through its top, upon which the eggs to be tested are to be placed, with a hinged dome having an opening through its top, through which the eggs can be inspected, and which has a dog connected to it, so that every time the dome is turned back for the purpose of removing the eggs which have been tested it will operate a counting mechanism, so as to register the eggs as fast as they are tested without any attention on the part of the operator, all of which will be more fully described hereinafter.

The object of my invention is to provide a device by which eggs can be tested and automatically registered at the same time without requiring any further attention on the part of the operator than to simply keep account of the number of times the bell is rung and then multiplying that number by twelve or twenty-four times the number of eggs that have been tested each time.

Figure 1 is a side elevation of my invention, showing the dome in one position. Fig. 2 is a vertical section of the same, showing the dome in another position. Fig. 3 is a detail view.

A represents a suitable box or frame of any suitable size or shape, and in which the lamp or light B, of any suitable kind, is placed. Through the top of the box and through the sides are made suitable openings for the admission of air to support the combustion of light. Through the top of this frame, at one end, are made a series of openings, C, which may either be less or more than a dozen. Where eggs have to be tested on a large scale the number of these openings may be increased to any desired degree; but where the tester is for only ordinary use six holes will be found to be sufficient. Upon the top of this portion of the frame is placed cloth or any other suitable soft substance which will serve to prevent the eggs from being broken while being placed upon the holes.

Hinged upon the top of the frame is the dome D, which is made to cover the opening C, upon which the eggs are to be placed, and which dome has a suitable opening, E, through its top, through which the operator looks when examining the condition of the eggs. The light from the lamp passing through the eggs enables the operator to tell at a glance, while looking down through the opening in the top of the dome, which eggs are good and which are bad by their color. This dome is turned backward for the purpose of allowing the eggs to be placed in position, and is then closed down over them while they are being examined. Fastened to this dome in any suitable point is a curved dog or lever, G, which engages with the teeth of the ratchet-wheel H, so that each time that the dome is turned backward the dog will be made to turn the wheel forward one notch. Fastened to the shaft of this wheel is the index-hand I, which registers the number of times the dome has been moved backward.

Upon the opposite end of the shaft of the wheel is placed an arm, J, which raises the striking device L each time that the hand moves around, so as to ring the bell N, and thus call the attention of the operator to the fact that the hand has made a complete circuit. If six eggs are being tested each time, the index-hand indicates the number of dozens which have been tested. Should it only be desired to test three or four eggs, or a less number when there are six openings C, the other openings C may be closed over, so that there will be no mistake made in the counting. The same handle serves to carry the tester around and to prevent the dome from being moved too far backward.

Upon the front of the dome may be placed a second indicator for the purpose of keeping account of the number of times the hand I has made a complete circuit.

Having thus described my invention, I claim—

1. The egg-tester above described, consisting of the combination of the frame having the perforated plate, upon which the eggs are placed, with a hinged dome made to close down over the eggs, and which dome has connected to it a dog and lever for operating a counting mechanism, substantially as shown.

2. The egg-tester above described, consisting of the combination of the frame A, a lamp, B, a hinged dome which is to be closed down over the opening C, upon which the eggs are to be placed, a lever which is pivoted to the dome, a ratchet-wheel having connected to one end of its shaft an index-hand and at the other an arm or lever which operates the striker of the bell, substantially as described.

In testimony whereof I affix my signature in presence of two witnesses.

WALLACE KIRKPATRICK.

Witnesses:
A. G. BRITTON,
F. M. COLLINS.